US010344782B2

(12) United States Patent
Penning et al.

(10) Patent No.: US 10,344,782 B2
(45) Date of Patent: Jul. 9, 2019

(54) VALVE SIGNATURE DIAGNOSIS AND LEAK TEST DEVICE

(71) Applicant: General Equipment and Manufacturing Company, Inc., Louisville, KY (US)

(72) Inventors: Bruce R. Penning, Louisville, KY (US); Jingli Li, Lexington, KY (US); Bruce Rigsby, Charlestown, IN (US); Robert Lynn LaFountain, Charlestown, IN (US)

(73) Assignee: General Equipment and Manufacturing Company, Inc., Louisville, KY (US)

( * ) Notice: Subject to any disclaimer, the term of this patent is extended or adjusted under 35 U.S.C. 154(b) by 34 days.

(21) Appl. No.: 14/556,708

(22) Filed: Dec. 1, 2014

(65) Prior Publication Data

US 2015/0168246 A1 Jun. 18, 2015

Related U.S. Application Data

(62) Division of application No. 13/173,550, filed on Jun. 30, 2011, now Pat. No. 8,905,371.

(51) Int. Cl.
*F15B 19/00* (2006.01)
*F16K 11/07* (2006.01)

(52) U.S. Cl.
CPC .......... *F15B 19/002* (2013.01); *F15B 19/005* (2013.01); *F16K 11/0712* (2013.01); *Y10T 137/7761* (2015.04); *Y10T 137/8671* (2015.04)

(58) Field of Classification Search
CPC ... F16K 11/0712; F15B 19/002; F15B 19/005
USPC ..................................................... 137/625.48
See application file for complete search history.

(56) References Cited

U.S. PATENT DOCUMENTS

| | | | | | |
|---|---|---|---|---|---|
| 2,989,988 | A * | 6/1961 | Rudelick | C02F 1/42 | 137/625.48 |
| 3,590,874 | A * | 7/1971 | Rice | F16K 11/07 | 137/625.48 |
| 3,682,575 | A * | 8/1972 | Guddal | F01L 23/00 | 137/625.48 |

(Continued)

OTHER PUBLICATIONS

International Search Report and Written Opinion from International Application No. PCT/US2012/043316 dated Oct. 12, 2012—9 pages.

(Continued)

*Primary Examiner* — Eric Keasel
(74) *Attorney, Agent, or Firm* — Marshall, Gerstein & Borun LLP

(57) ABSTRACT

A valve signature diagnosis and leak testing device includes a spool valve operatively connected to a pilot valve, the pilot valve being configured to position the spool valve to one of an open position and a closed position. A blocker valve is fluidly connected to a control fluid outlet of the spool valve. An electrical module is operatively connected to the pilot valve, a supply of control fluid, and the blocker valve, the electrical module being capable of sending pulsed electrical signals to the pilot valve and the blocker valve to selectively position the spool valve and the blocker valve to an open or closed position.

4 Claims, 7 Drawing Sheets

(56) References Cited

U.S. PATENT DOCUMENTS

| | | | | |
|---|---|---|---|---|
| 3,819,152 | A * | 6/1974 | Clippard, III | F15B 13/0402 137/625.48 |
| 4,181,017 | A | 1/1980 | Markle | |
| 4,203,571 | A * | 5/1980 | Ruchser | F16K 11/0704 137/625.66 |
| 4,215,844 | A | 8/1980 | Bowen | |
| 4,535,821 | A * | 8/1985 | Anderson | B01F 5/0413 137/625.48 |
| 5,595,218 | A * | 1/1997 | Hallbach | F16K 11/07 137/625.48 |
| 6,685,159 | B1 | 2/2004 | Schnell | |
| 6,739,293 | B2 | 5/2004 | Turner et al. | |
| 6,976,506 | B2 * | 12/2005 | Towne | F15B 13/0402 137/625.48 |
| 7,086,358 | B2 | 8/2006 | Panciroli | |
| 7,380,570 | B1 * | 6/2008 | Orr | F16K 11/0712 137/625.25 |
| 7,637,281 | B2 * | 12/2009 | Rapke | F15B 13/0402 137/625.64 |
| 8,413,677 | B1 | 4/2013 | Coffman et al. | |
| 2005/0224115 | A1 | 10/2005 | Lun-Jung | |
| 2006/0191314 | A1 | 8/2006 | Karte | |
| 2008/0004836 | A1 | 1/2008 | Tewes et al. | |
| 2009/0309052 | A1 | 12/2009 | Kresse et al. | |
| 2010/0065258 | A1 | 3/2010 | Blomquist | |
| 2010/0181513 | A1 | 7/2010 | Kresse | |
| 2010/0229975 | A1 | 9/2010 | Sweeney et al. | |

OTHER PUBLICATIONS

International Search Report PCT/US2012/040879 dated Oct. 12, 2012.

Written Opinion PCT/US2012/040879 dated Oct. 12, 2012.

Office Action for U.S. Appl. No. 13/167,449, dated Aug. 2, 2013.

Chinese Office Action for Application No. 201110276368.7, dated Dec. 2, 2015.

Chinese Office Action for Application No. 201110276368.7, dated Dec. 19, 2016.

* cited by examiner

VALVE SIGNATURE DIAGNOSIS AND LEAK TEST DEVICE

RELATED APPLICATIONS

This application is a divisional of U.S. patent application Ser. No. 13/173,550, filed Jun. 30, 2011, the entirety of which is hereby incorporated by reference herein.

TECHNICAL FIELD

The present invention relates generally to control valve signature diagnosis and leak test devices and more specifically to control valve signature diagnosis and leak test devices having a blocker valve that is electrically pulsed.

BACKGROUND

Existing process control systems often employ control valves to control fluid flow though the process control system. Because control valves occasionally fail, it is desirable to perform periodic diagnostics on process control devices or process control components, such as the control valves, to determine the operability and performance of such devices. Determining the operability of a process control device may permit better scheduling of maintenance of the process control device, thereby decreasing failure occurrences and down time. This may result in increased efficiency, safety, and revenue. The process control systems may use various sensors and other measurement devices to observe characteristics of a process control device. For example, some existing control systems may use a digital valve controller to measure and collect data from various sensors on a control valve.

One diagnostic used to evaluate control valves is a valve signature test that measures the position of an actuator or actuator valve opening against an input to the valve, such as an actuator pressure or control signal. A graphical presentation of a signature graph may make it easier for plant operators to notice or detect changes in the characteristics of a valve that may indicate degradation in equipment, and thus, some control systems may implement valve maintenance software, such as AMS™ ValveLink® software from Fisher Controls International LLC of St. Louis, Mo., to display signature graphs. Some valve characteristics that may be determined from a valve signature test may include, but are not limited to, valve friction, actuator torque, dead band and shutoff capability, and actuator spring rate and bench set.

For example, a valve signature test may be run when a control valve is new in order to benchmark the control valve's performance (e.g., valve manufacturer testing). One skilled in the art may understand that the valve signature test may record and/or trend the travel distance or position of the moveable element, such as a valve plug, in the control valve when opening and closing with respect to the applied actuating pressure for initiating such movement. As subsequent valve signature tests are performed on the control valve over time, the results of the signature tests may be reviewed with respect to previous tests to determine various characteristic changes, such as changes in actuator spring rate and valve friction or torque, to determine whether any degradation in performance or control of the control valve has occurred.

In addition to valve signature testing, control valves often need leak testing to determine when and if the valve is leaking, thus needing repair or replacement.

Some process control systems may have valve positioning devices (e.g., positioners) that both measure the actual position of a valve member and compare the actual position against a desired position. If the actual position and desired position differ from one another, the positioner adjusts the actual position to match the desired position. Because the positioner both measures the signal inputs into the valve actuator and the position of the valve member, software within the positioner (or in a computer operatively connected to the positioner) may compare the actual measurements to desired or baseline measurements to determine whether valve performance is degrading. Positioners may include leak testing capability.

However, less sophisticated process control systems may utilize control valves without positioners. Currently no simple, cost effective, devices exist that are capable of monitoring the performance of control valves, or testing for leaks, without positioners.

SUMMARY

A valve signature diagnosis and leak testing device includes a spool valve operatively connected to a pilot valve, the pilot valve being configured to position the spool valve to one of an open position and a closed position. The spool valve includes a first control fluid inlet, a first control fluid outlet, and a second control fluid outlet, the first control fluid inlet being fluidly connected to a supply of control fluid and the first control fluid outlet being configured to be connected to a valve actuator. A blocker valve is fluidly connected to the second control fluid outlet of the spool valve. An electrical module is operatively connected to the pilot valve, the supply of control fluid, and the blocker valve, the electrical module being capable of sending pulsed electrical signals to the pilot valve and the blocker valve to selectively position the spool valve and the blocker valve to an open or closed position. In an open position, the spool valve fluidly connects the first control fluid inlet to the first control fluid outlet and in a closed position the spool valve fluidly connects the first control fluid outlet to the second control fluid outlet.

A method of performing valve signature diagnosis for a control valve without a positioner includes sending an electrical signal from the electrical module to the blocker valve, which closes the blocker valve, and sending an electrical signal from the electrical module to the spool valve in a pulsed manner to open the spool valve, admitting control fluid to a valve actuator, in a step-wise manner. Pressure within the actuator and a position of a control element are measured for each pulse and the pressures and positions are plotted to generate a valve signature graph.

A method of performing a leak test in a control valve without a positioner includes sending an electrical signal from the electrical module to the blocker valve, which closes the blocker valve, and sending an electrical signal from the electrical module to the spool valve, which closes the spool valve. Pressure within the valve actuator and a position of the control element are monitored for a specified period of time to determine whether a leak exists in the actuator.

DETAILED DESCRIPTION OF THE PREFERRED EMBODIMENTS

Although the following text sets forth a detailed description of exemplary embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Based upon reading this disclosure, those of skill in the art may be able to implement one or more alternative embodiments, using either current technology or technology developed after the filing date of this patent. Such additional indictments would still fall within the scope of the claims defining the invention.

Control devices used in process control systems may include process control devices, such as a control valves, dampers or other alterable opening means, to modulate or control fluid flow within the process control system. Although the example embodiments described herein are based upon pneumatically-actuated control valves, other process control devices such as pumps, electrically-actuated valves, dampers and the like may also be contemplated without departing from the spirit and scope of the present invention. In general, control devices, such as control valve assemblies, may be positioned in conduits or pipes to control fluid flow by altering the position of a moveable element, such as a valve plug within the control valve, using an attached actuator. Adjustments to the control element may be used to influence some process condition to maintain a selected flow rate, a pressure, a fluid level, or a temperature.

The control valve assembly is typically operated from a regulated source of pneumatic fluid pressure, such as air from a plant compressor, although other control fluids may be used. This fluid pressure is introduced into the actuator (such as a spring and diaphragm actuator for sliding stem valves or a piston actuator for rotary valves) through a valve control instrument which controls the fluid pressure in response to a signal received from the process control system. The magnitude of the fluid pressure in the actuator determines the movement and position of the spring and diaphragm or piston within the actuator, thereby controlling the position of a valve stem coupled to the control element of the control valve. For example, in the spring and diaphragm actuator, the diaphragm must work against a bias spring, to position the control element (i.e., valve plug) within a valve passageway between the inlet and the outlet of the control valve to modify flow within the process control system. The actuator may be designed so that increasing fluid pressure in the pressure chamber either increases the extent of the control element opening or decreases it (e.g., direct acting or reverse acting).

Figure 1:
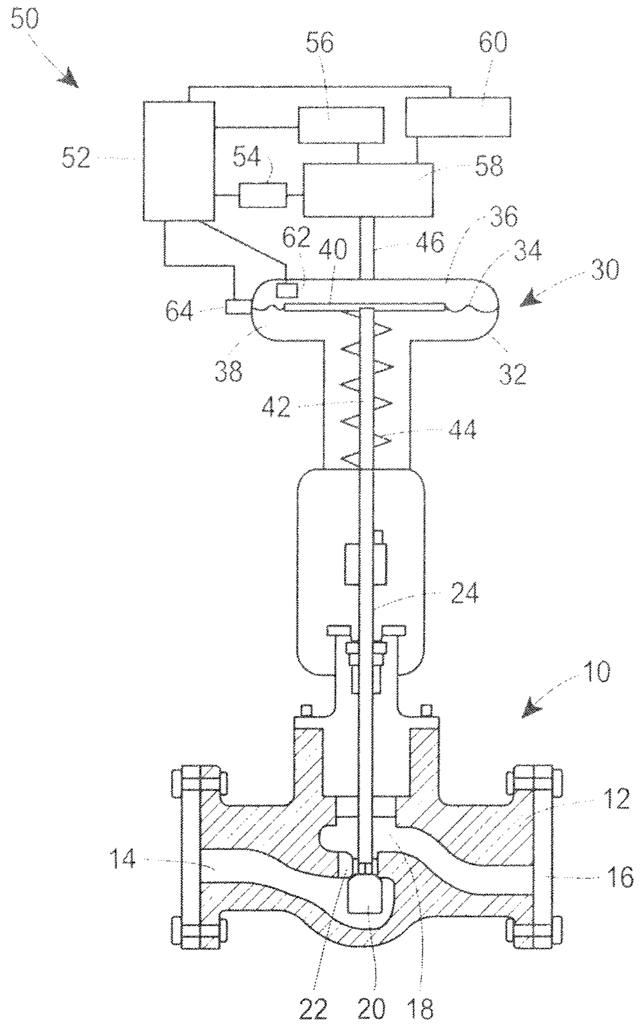
FIG. 1 is a cross-sectional view of control valve including a valve signature diagnosis and leak testing device.
Figure 2:
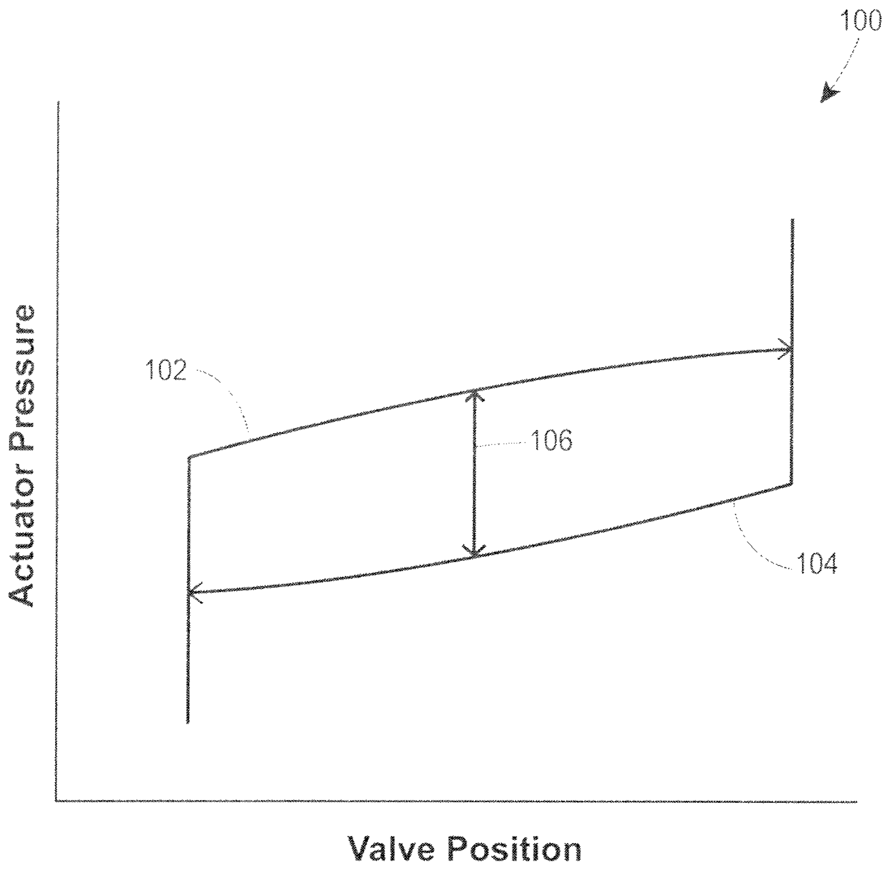
FIG. 2 is an example of a valve signature graph.

The control valve 10 of the system illustrated in FIG. 1, includes relationships involving characteristic loops between an output variable, such as a valve position, and an input variable, such as a setpoint or command signal. This relationship may be referred to as a signature graph, an example of which is illustrated in FIG. 2, where, for example, an actuator pressure is plotted against the position of the control element as represented by valve stem or actuator stem position. As illustrated in FIG. 2, a full range input-output characteristic for fluid pressure in the actuator may be plotted over a corresponding range of the output position of the moveable element of the control valve 10. Alternative input variables, such as setpoint command signals, may also be used in signature graphs.

One method of diagnosing control valve performance problems is to generate a full or partial signature graph and to compare the full or partial signature graph to a baseline or original signature graph for the control valve. By comparing the two graphs, engineers can determine what part of the control valve may be degraded or failing based upon differences between the two graphs.

Returning to FIG. 1, the control valve 10 includes a valve body 12 having a fluid inlet 14 and a fluid outlet 16, connected by a fluid passageway 18. A control element or valve plug 20 cooperates with a valve seat 22 to vary fluid flow through the control valve 10. The valve plug 20 is connected to a valve stem 24 which moves the valve plug 20 relative to the valve seat 22. An actuator 30 provides force to move the valve plug 20. The actuator 30 includes an actuator housing 32 that encloses a diaphragm 34. The diaphragm 34 separates the actuator housing 32 into a first chamber 36 and a second chamber 38, which are fluidly separated from one another by the diaphragm 34. The diaphragm 34 is mounted to a diaphragm plate 40 that is attached to an actuator stem 42. The actuator stem 42 is connected to the valve stem 24. A spring 44 is disposed in the second chamber 38 and biases the diaphragm plate 40 towards from the valve seat 22 in this embodiment. In other embodiments, the spring 44 may be located in the first chamber 36, or the spring 42 may bias the diaphragm plate away from the valve seat 22. Regardless, by varying the pressure in one of the first and second chambers 36, 38, the actuator stem 42 moves, which positions the valve plug 20 relative to the valve seat 22 to control fluid flow through the valve 10. In the embodiment of FIG. 1, the actuator housing 32 includes a control fluid inlet port 46 for providing control fluid to the first chamber 36, or for removing control fluid from the first chamber 36 to vary the control fluid pressure in the first chamber 36.

A valve signature diagnosis and leak test device 50 is connected to the control fluid inlet port 46 of the actuator 30. The valve signature diagnosis and leak test device 50 controls the flow of control fluid into, and out of, the actuator 30 in a step-wise manner to generate a full or partial valve signature graph. The valve signature diagnosis and leak test device 50 is also capable of performing leak tests on the control valve 10. The valve signature diagnosis and leak test device 50 includes an electrical module 52, a pilot valve 54, a source of control fluid, such as a pneumatic supply tank 56, a spool valve 58, and a blocker valve 60. The electrical module 52 receives pressure and position inputs from a pressure sensor 62 and a position sensor 64 that are attached to, or located within, the actuator housing 32. The pressure sensor 62 measures control fluid pressure within the first chamber 36 in this embodiment. In other embodiments, the pressure sensor 62 may measure control fluid pressure, or other fluid pressure, within the second chamber 38. The position sensor 64 measures a position of the diaphragm 34, diaphragm plate 40, actuator stem 44, and/or valve stem 24. Although the position sensor 64 may measure a position of more than one of the diaphragm 34, diaphragm plate 40, actuator stem 44 and valve stem 24, the position of only one of these elements is needed by the electrical module 52.

Signals from the pressure sensor 62 and the position sensor 64 are transmitted to the electrical module 52, where the signals are interpreted and the electrical module 52 sends further signals to one or more of the pilot valve 54, supply tank 56, and valve blocker 60 to actuate the valve stem 24. Signals from the pressure sensor 62 and position sensor 64 may be sent to the electrical module 52 via a wired connection, a wireless connection, or any other electrical connection. Alternatively, the pressure sensor 62 and position sensor 64 may send pneumatic, hydraulic, or mechanical signals to the electrical module 52. The electrical module 52, in turn, sends control signals to the pilot valve 54, supply tank 56, and blocker valve 60. The control signals may be electrical signals sent via wired or wireless connections. Alternatively, the control signals may be pneumatic, hydraulic, or mechanical signals. In any event, the control signals are pulsed to move the spool valve 58 and the blocker valve 60 in a step-wise manner.

FIG. 2 illustrates a full-stroke signature graph 100 where a control valve is fully opened from a fully closed position (upstream portion) 102 and where the control valve is fully closed from a fully open position (downstream portion) 104. The signature graph 100 illustrates that an initial pressure buildup is required to overcome momentum and friction or torque of the actuator 30 and/or control valve 10 before the control valve 10 begins to open and permit flow. When transitioning from an opening movement to a closing movement, momentum and friction may need to be overcome to force the control valve 10 in the other direction. The pressure required for the transition movement may be illustrated by a vertical path 106 crossing between the upstream and downstream paths 102, 104. The area between the upstream and downstream paths 102, 104 may be referred to as the deadband.

As control valve performance degrades over time (e.g., control element wear, valve packing wear, leaks in the actuator pressure chamber, etc.), the signature graph may change from an initial benchmark graph. This change in the signature graph over time may be indicative of degradation in operation of the valve due to, for example, friction. The change may prompt repair or replacement of the valve or components of the valve.

A baseline signature graph may be obtained from a manufacturer test. Alternatively, the baseline signature graph may be derived from user measurements either before installation or during some initial operation time. This baseline graph may be used to assist the user in configuring the boundary. For example, using the displayed baseline signature graph, a user may set or configure one or more boundaries that may serve as deviation thresholds from the baseline against which new signature graph measurements may be compared with. The boundaries may be updated as the user configures them using the baseline signature graphs. Alternatively, the boundaries may be drawn using a typical computer input device such as a mouse or light pen. One example of an evaluation system for valve signature graphs is disclosed in U.S. Patent Publication No. 2008/0004836, assigned to Fisher Controls International. U.S. Patent Publication No. 2008/0004836 is hereby incorporated by reference herein.

The boundaries that are configured by the user using a baseline signature graph may be used to determine whether an updated, current, or new signature graph conforms to the tolerances represented by the preset boundaries or whether the signature graph indicates a degradation or deviation in one or more characteristics that require some maintenance action, such as repair or replacement of the control valve. For example, after configuring one or more boundaries, a current signature graph may be measured and analyzed against the configured boundaries to determine whether any graph points violate or exceed the boundaries. A current signature graph may be displayed and superimposed on the pre-configured boundaries to determine characteristic failures, for example, whether the current signature graph has points outside of a preset boundary.

As described above, other tests may indicate impending valve failure or degraded valve performance. One of these tests is a leak test. In the leak test, the actuator 30 is pressurized with control fluid and then all fluid inputs and outputs in the actuator 30 are closed and valve position is monitored for a certain period of time. If the control element moves during the test, a leak is present in the actuator 30. If the control element does not move during the test, the actuator 30 is considered to be leak free.

Figure 3:
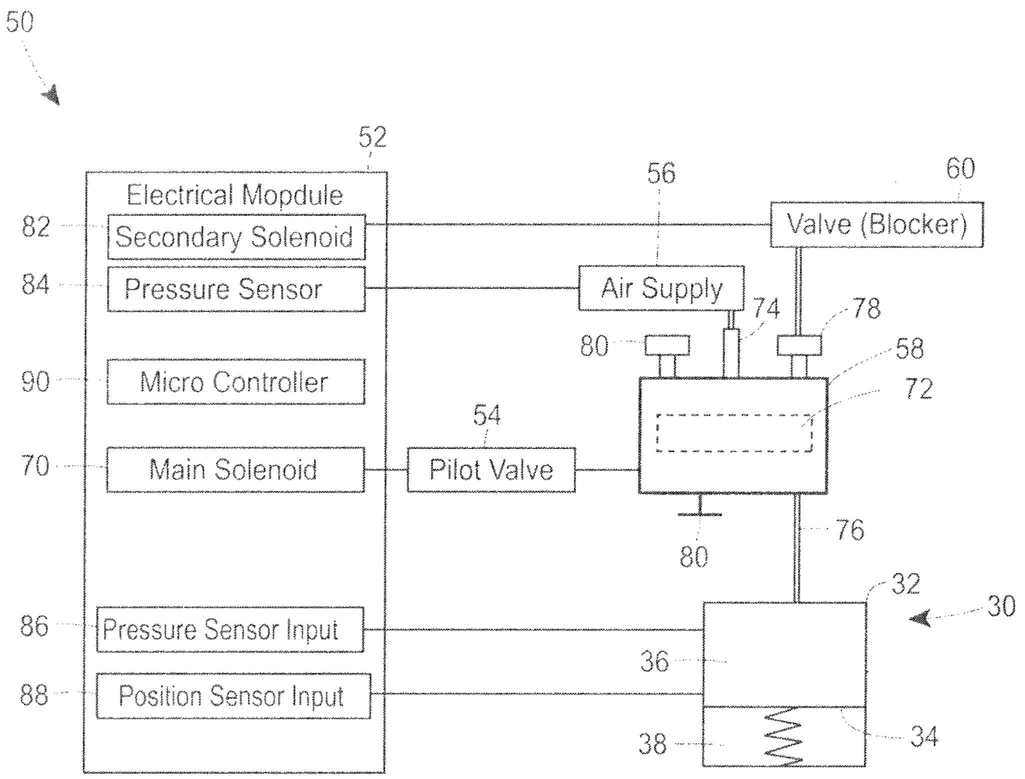
FIG. 3 is a schematic illustration of the valve signature diagnosis and leak testing device of FIG. 1.

FIG. 3 illustrates the valve signature diagnosis and leak test device 50 in more detail. The electrical module 52 includes a main solenoid 70 communicatively connected to the pilot valve 54. The main solenoid 70 controls a configuration of the spool valve 58 by sending command signals to the pilot valve 54, which, in turn, positions the spool valve 58. In one embodiment, the command signal sent from the main solenoid 70 is an electrical signal and a signal sent from the pilot valve 54 to the spool valve 58 is a pneumatic or hydraulic signal. In other embodiments, the signal from the pilot valve 54 may also be an electrical signal. In any event, the command signals from the main solenoid 70 and the pilot valve 54 are pulsed so that the spool valve 58 moves in a step-wise manner. The spool valve 58 includes a slidable piston 72 that moves in response to the signal from the pilot valve 54. The spool valve 58 also includes a control fluid inlet port 74, a first control fluid outlet port 76, and a second control fluid outlet port 78. The spool valve 58 may also include one or more plugs 80.

The electrical module 52 may also include a secondary solenoid 82 that is communicatively connected to the blocker valve 60. The secondary solenoid 82 sends electrical signals to the blocker valve 60 to open or close the blocker valve 60. A first pressure sensor 84 measures pressure in the supply tank 56, while a second pressure sensor input 86 receives a pressure signal from the pressure sensor 62 (FIG. 1) that indicates fluid pressure in the actuator 30. A position sensor input 88 receives a position sensor signal from the position sensor 64 (FIG. 1) that indicates a position of the actuator stem 42 and/or valve stem 24. A processor 90 selectively positions the pilot valve 54, spool valve 58, and the blocker valve 60 in order to produce data that may be used to form valve signature graphs and/or to perform leak tests.

Figure 4:
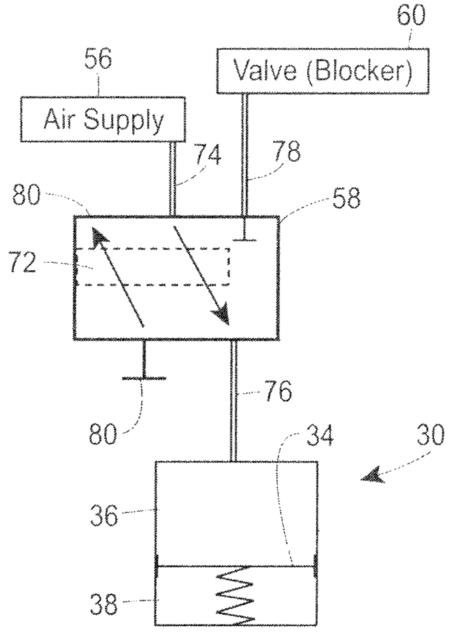
FIG. 4 is a schematic illustration of a portion of the valve signature diagnosis and leak testing device of FIG. 3 with a spool valve in an open position.

As illustrated in FIG. 4, when both main solenoid 70 and the secondary solenoid 82 are powered, the spool valve 58 is configured to an open position, which ports control fluid into the actuator 30 from the supply tank 56 by fluidly connecting the control fluid inlet port 74 with the first control fluid outlet port 76. As control fluid flows from the supply tank 56, through the spool valve 58, and into the actuator 30, control fluid pressure will increase in the first chamber 36 of the actuator 30, causing the diaphragm 34, and the diaphragm plate 40, to move towards the control valve 10 (FIG. 1). As a result, the actuator stem 42 and the valve stem 24 will also move towards the control valve 10, causing the valve plug 20 to move away from the valve seat 22, which results in more fluid flow through the control valve.

Figure 5:
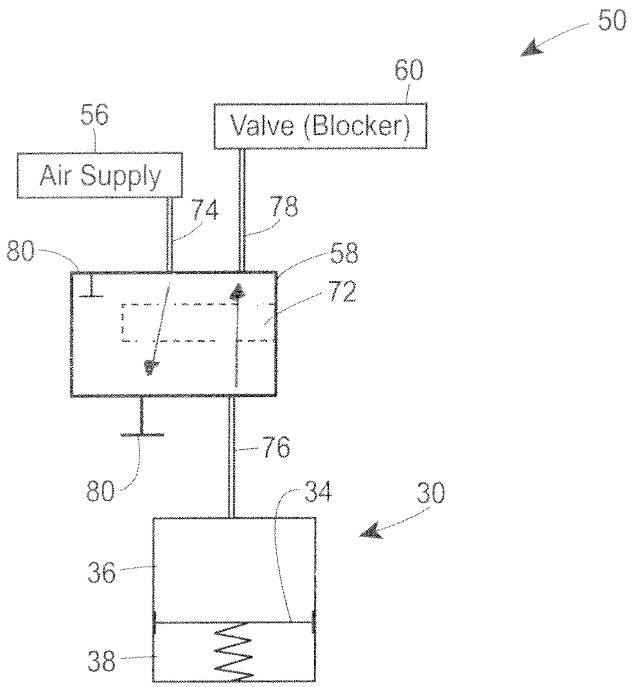
FIG. 5 is a schematic illustration of a portion of the valve signature diagnosis and leak testing device of FIG. 3 with the spool valve in a closed position.

As illustrated in FIG. 5, when the main solenoid 70 is not powered and the secondary solenoid 82 is powered, spool valve 58 is configured to a closed position in which control fluid flows out of the actuator 30 through the second control fluid outlet port 78 and the first control fluid outlet port 76 (which in this case ports fluid out of the actuator 30 and into the spool valve 58). The blocker valve 60 is closed due to the powering of the secondary solenoid 82. As control fluid flows from the actuator 30, through the spool valve 58, and into the blocker valve 60, the control fluid is stopped at the blocker valve 60. As a result, control fluid 60 is trapped between the blocker valve 60 and the diaphragm 34. If the main solenoid 70 is pulsed in this configuration, small quantities of control fluid will be forced into the actuator 30, which will increase pressure in the first chamber 36 causing the diaphragm 34 to move towards the control valve 10 (FIG. 1). By measuring the pulses and the valve positions and pressures after each pulse, a valve signature graph can be generated for a valve signature diagnosis.

The processor 90 sends signals in the form of electrical pulses to the main and secondary solenoids 70, 82 to operate the main and secondary solenoids 70, 82 in a step-wise manner. In this way, the processor 90 can precisely and incrementally cause control fluid to flow into or out of the actuator 30 by controlling positions of the spool valve 58 and the blocker valve 60. As a result, the actuator stem 42 and the valve stem 24 also move incrementally.

The valve signature diagnosis and leak test device 50 can also move the control element 20 in a step-wise manner from fully open to fully closed. When the main solenoid 70 is not powered, the secondary solenoid 82 may be pulsed to incrementally open the blocker valve 60, which lets small quantities of control fluid flow out of the actuator 30. By measuring valve pressures and positions during the pulsed movement, the valve signature diagnosis and leak test device 50 can generate a valve signature graph for valve signature diagnosis.

Moreover, the valve signature diagnosis and leak test device 50 may perform a leak test by initially powering on the main and secondary solenoids 70, 82 so that control fluid builds in the actuator 30 and the valve plug 20 moves towards the fully open position. The valve plug 20 need not be fully open to perform the leak test, the valve plug 20 needs only be partially open. Once the valve plug 20 is in the fully or partially open position, the main solenoid 70 is powered off, severing the fluid connection between the actuator 30 and the air supply 56. The blocker valve 60 prevents control fluid from escaping the actuator through the first and second control fluid outlet ports 76, 78. Thus, control fluid is trapped in the actuator 30. By measuring pressure and valve position for a predetermined amount of time, any leaks in the actuator 30 can be identified.

Figure 6:
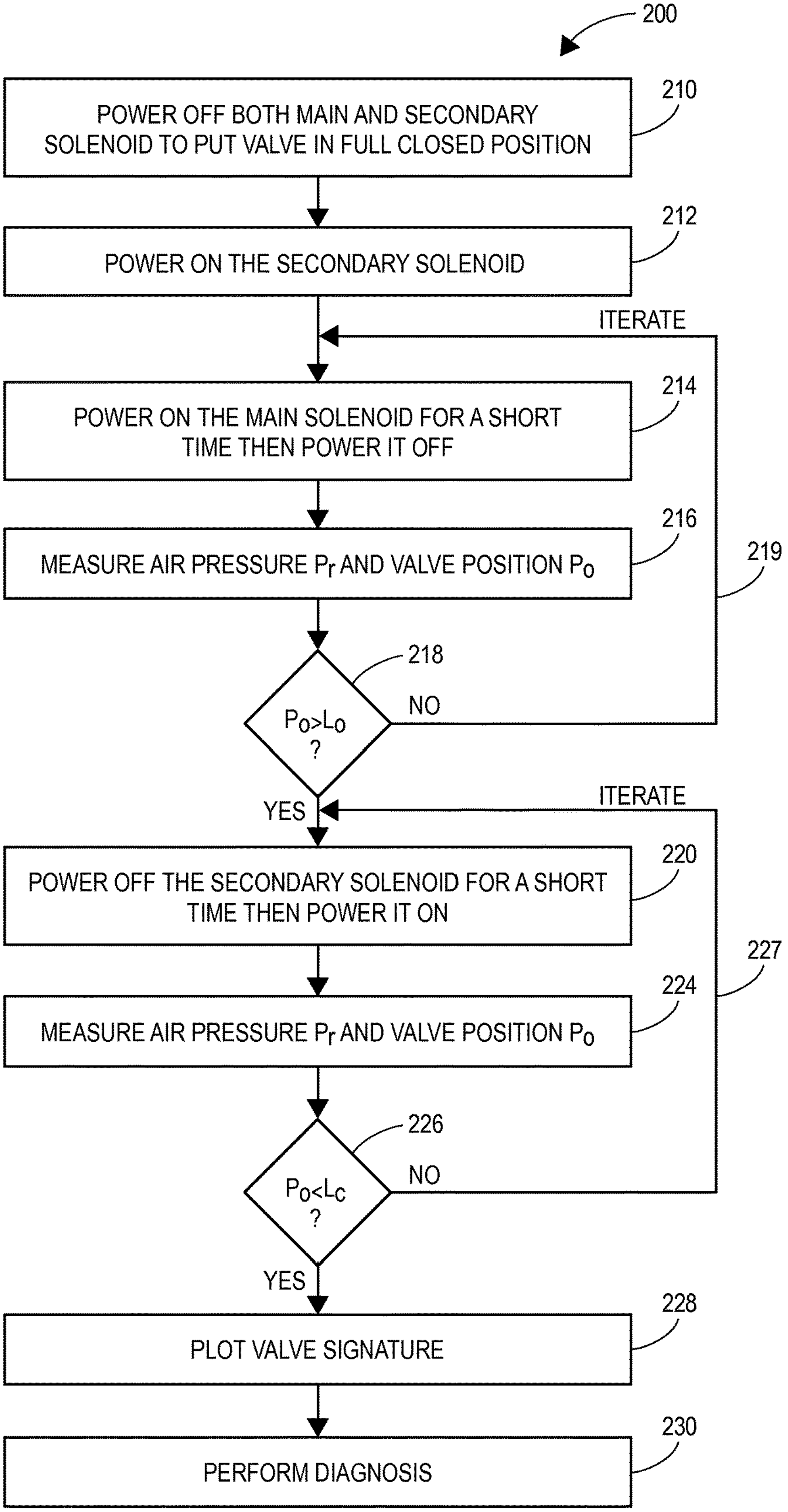
FIG. 6 is a logic diagram illustrating a valve signature test using the valve signature diagnosis and leak testing device of FIG. 1.

Referring now to FIG. 6, a logic diagram 200 illustrates an example method of performing a valve signature diagnosis test using one embodiment of the valve signature diagnosis and leak test device. The valve signature diagnosis test begins at step 210 in which both the main solenoid and the secondary solenoid are powered off to move the valve plug 20 (FIG. 1) to a full closed position. The secondary solenoid is then powered on at step 212. At step 214, the main solenoid 70 is powered on for a short time, and then powered off. The amount of time the main solenoid 70 is powered varies based on the actuator type, the actuator size, or the control fluid pressure. Both air pressure $P_r$ within the actuator 30 and a position of the valve plug or valve stem $P_o$ are measured and recorded at step 216. If $P_o$ is not greater than $L_o$ ($L_o$ being defined as the desired fully or partially open position) at step 218, loop 219 is repeated until $P_o$ is greater than $L_o$. Once $P_o$ is greater than $L_o$, the secondary solenoid 82 is powered off for a short time. The amount of time the secondary solenoid 82 is powered off varies based on the actuator type, the actuator size, or the control fluid pressure. Again, both the air pressure within the actuator $P_r$ and the position of the valve plug or valve stem $P_o$ are measured and recorded. If $P_o$ is not less than $L_c$ ($L_c$ is defined as the desired fully or partially closed position) at step 226, loop 227 is repeated until $P_o$ is less than $L_c$. Once Po is less than $L_c$, the valve signature is plotted at step 228. Finally, the valve signature plotted at step 228 is analyzed at step 230 and any problems are diagnosed.

Figure 7:
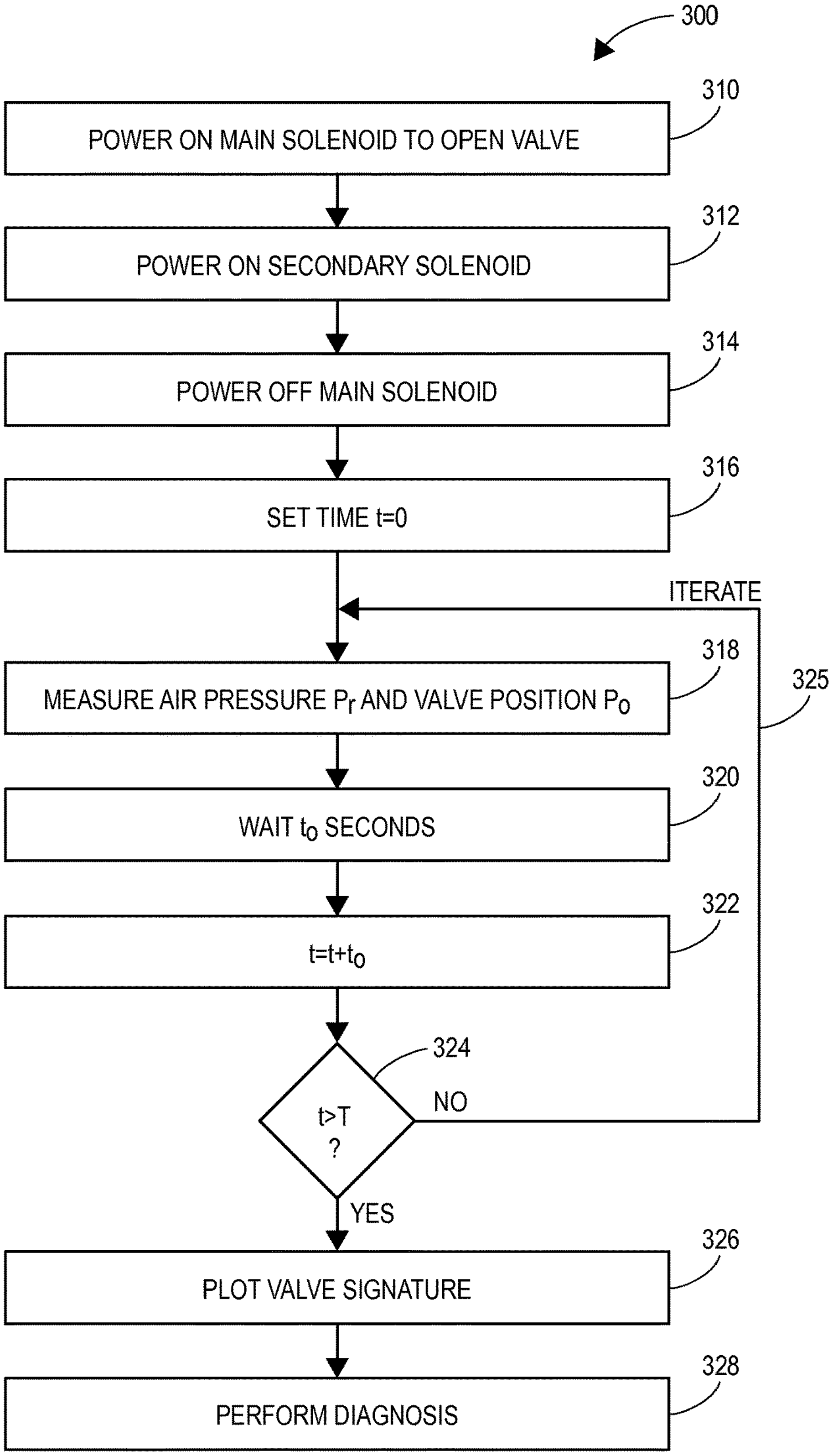
FIG. 7 is a logic diagram illustrating a leak test using the valve signature diagnosis and leak testing device of FIG. 1.

Referring now to FIG. 7, a logic diagram 300 illustrates an example method of performing a valve leak test using one embodiment of the valve signature diagnosis and leak test device. The valve leak test begins at step 310 in which the main solenoid is powered on to move the valve plug 20 (FIG. 1) to a full open position. The secondary solenoid is then powered on at step 312. At step 314, the main solenoid is powered off. At step 316, time t is set equal to 0. Both air pressure $P_r$ within the actuator 30 and a position of the valve plug or valve stem $P_o$ are measured and recorded at step 318. At step 320, the test delays for a period of time $t_0$ (e.g., 27 hours or more). Time $t_0$ is added to t at step 322. If t is less than T, where T is the total waiting time (e.g., 10 days), at step 324, loop 325 is repeated until t is greater than T. The results are plotted at step 326 and analyzed at step 328 to diagnose leaks.

Accuracy of the speed control is determined by the number of steps and the solenoid valve response time. Accuracy may also be increased by adding algorithms, such as PID control, to the processor 90.

Figure 8:
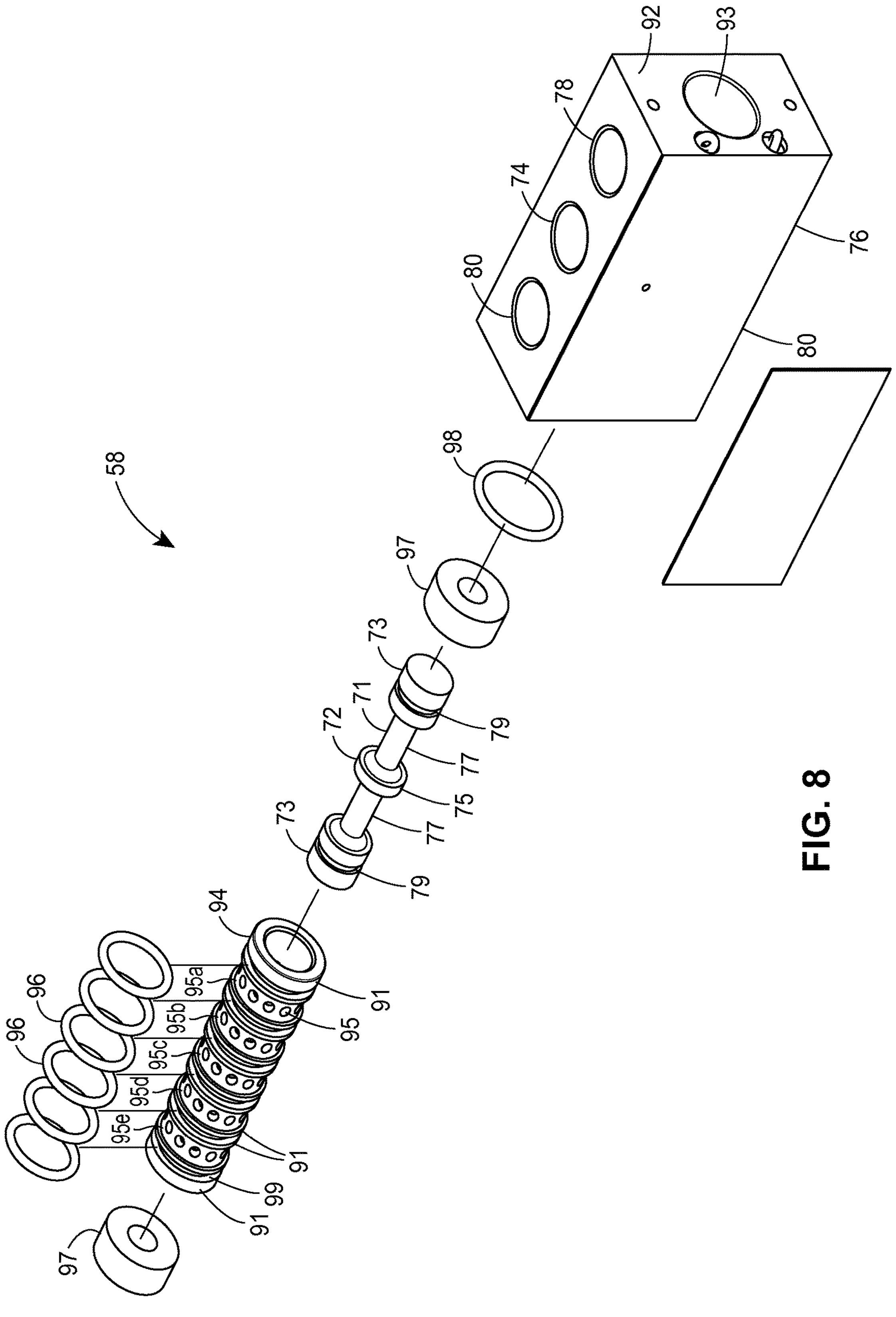
FIG. 8 is an exploded perspective view of one embodiment of a spool valve or a blocker valve of the valve signature diagnosis and leak testing device of FIG. 1.

FIG. 8 illustrates one embodiment of the spool valve 58. A similar or identical structure may be used for the blocker valve 60. The spool valve 58 includes a valve body 92 having a central bore 93 fluidly connected with the plugs 80, control fluid inlet port 74, the first control fluid outlet port 76, and the second control fluid outlet port 78. A perforated sleeve 94 is disposed within the central bore 93 and the slidable piston 72 is disposed within the perforated sleeve 94.

The slidable piston 72 comprises a central axle 71 and a plug 73 at either end of the central axle 71. A central disk 75 is disposed between the two plugs 73. The plugs 73 and central disk 75 are cylinder shaped and coaxially located along the central axle 71. The plugs 73 and central disk 75 have radii that are approximately equal to an inner radius of the perforated sleeve 94. Space between the plugs 73 and the central disk 75 forms cavities 77 for fluid flow. The plugs 73 may include annular recesses 79 for receiving additional seals, such as o-rings (not shown).

The perforated sleeve 94 includes a plurality of openings 95 dispersed about a periphery of the perforated sleeve 94. The openings 95 allow control fluid to flow through portions of the perforated sleeve 94. The perforated sleeve 94 may include a plurality of seals, such as o-rings 96 that seal against an inner surface of the central bore 93. The o-rings 96 may divide the plurality of openings 95 into distinct groups and the o-rings 96 may prevent cross-flow between individual groups of openings 95 outside of the perforated sleeve 94. Each opening group 95*a*, 95*b*, 95*c*, 95*d*, 95*e*, may be generally aligned with one or more of the plugs 80, the control fluid inlet port 74, the first control fluid outlet port 76, and the second control fluid outlet port 78. The opening groups 95*a*, 95*b*, 95*c*, 95*d*, 95*e*, may be separated from one another by one or more annular rings 91, which may include annular channels 99 for receiving the o-rings 96.

Spacers 97 and/or seals 98 may be disposed at either end of the perforated sleeve 94 to position and seal the perforated sleeve 94 within the central bore 93.

The slidable piston 72 shifts within the perforated sleeve in response to inputs from the pilot valve 54 to fluidly connect two of the control fluid inlet port 74, the first control fluid outlet port 76, and the second control fluid outlet port 78 with one another to control fluid flow through the spool valve 58, as described above. More specifically, as the slidable piston 72 shifts within the perforated sleeve 94, one or more of the opening groups 95*a-e* are fluidly connected with one another by the cavities 77 on the piston 72. Thus, control fluid flow may be selectively directed between the control fluid inlet 74, the first control fluid outlet 76, and the second control fluid outlet 78 based upon the position of the piston 72 within the perforated sleeve.

The disclosed valve signature diagnosis and leak test device advantageously determines performs both valve signature diagnosis testing and leak testing without the need for a valve positioner. By electrically pulsing the main and secondary solenoids, the spool valve and the blocker valve may be moved in a step-wise manner, which enhances both valve signature diagnosis and leak testing.

Numerous modifications and alternative embodiments of the invention will be apparent to those skilled in the art in view of the forgoing description. Accordingly, this description is to be construed as illustrative only and is for the purpose of teaching those skilled in the art the best mode of carrying out the invention. The details of the present disclosure may be varied without departing from the spirit of the invention, and the exclusive use of all modifications which are within the scope of the claims is reserved.

The invention claimed is:

1. A blocker valve for a signature diagnosis and leak testing device, the blocker valve comprising:

a valve body, the valve body including a central bore, a control fluid inlet port, a first control fluid outlet port, and a second control fluid outlet port, the central bore being fluidly connected to each of the control fluid inlet port, the first control fluid outlet port, and the second control fluid outlet port;

a first body plug and a second body plug in the valve body that are fluidly connected to the central bore;

a perforated sleeve disposed within the central bore, the perforated sleeve including a plurality of openings separated into at least two opening groups;

a slidable piston disposed within the perforated sleeve, the slidable piston including a central axle, a piston plug at either end of the central axle, and a central disk between the piston plugs, space between the piston plugs and the central disk forming at least one fluid recess, and each of the piston plugs and the central disk having a radius that is approximately equal to an inner radius of the perforated sleeve; and spacers disposed at either end of the perforated sleeve, outside of the perforated sleeve and within the valve body, the spacers positioning the perforated sleeve within the central bore, each spacer including a central opening adjacent to the perforated sleeve so that the piston plugs slide between the spacers, wherein one or more of the control fluid inlet port, the first control fluid outlet port, and the second control fluid outlet port are fluidly connected with one another by at least one opening group in the perforated sleeve and at least one fluid recess in the slidable piston, and wherein in a first position the slidable piston fluidly connects the control fluid inlet and the first control fluid outlet port and the slidable piston fluidly connects the first body plug and the second body plug, and in a second position the slidable piston fluidly connects the control fluid inlet and the second body plug.

2. The blocker valve of claim 1, wherein the groups of openings are separated by annular rings.

3. The blocker valve of claim 2, wherein at least one annular ring includes an annular channel.

4. The blocker valve of claim 3, further comprising an o-ring disposed in the annular channel.

* * * * *

UNITED STATES PATENT AND TRADEMARK OFFICE

CERTIFICATE OF CORRECTION

PATENT NO. : 10,344,782 B2
APPLICATION NO. : 14/556708
DATED : July 9, 2019
INVENTOR(S) : Bruce R Penning et al.

It is certified that error appears in the above-identified patent and that said Letters Patent is hereby corrected as shown below:

In the Specification

At Column 1, Line 7, “2011,” should be -- 2011, now Pat. No. 8,905,371, --.

At Column 1, Line 20, “though” should be -- through --.

At Column 4, Line 42, “spring 42” should be -- spring 44 --.

At Column 5, Line 4, “actuator stem 44,” should be -- actuator stem 42, --.

At Column 5, Line 7, “actuator stem 44” should be -- actuator stem 42 --.

At Column 5, Line 13, “valve blocker 60” should be -- blocker valve 60 --.

At Column 7, Line 20, “control fluid 60” should be -- control fluid --.

Signed and Sealed this
Thirty-first Day of March, 2020

Andrei Iancu
*Director of the United States Patent and Trademark Office*